United States Patent
Herman et al.

(10) Patent No.: US 12,488,122 B2
(45) Date of Patent: Dec. 2, 2025

(54) MULTI-TENANT FILE-LEVEL ENCRYPTION FOR INDEX BASED DATABASE

(71) Applicant: Oracle International Corporation, Redwood Shores, CA (US)

(72) Inventors: Shmuel Herman, Kirkland, WA (US); Bryan Pham, Sunnyvale, CA (US); Jim Battenberg, Issaquah, WA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 18/455,895

(22) Filed: Aug. 25, 2023

(65) Prior Publication Data

US 2025/0070970 A1    Feb. 27, 2025

(51) Int. Cl.
 *G06F 21/62* (2013.01)
 *H04L 9/08* (2006.01)
 *H04L 9/14* (2006.01)

(52) U.S. Cl.
 CPC .......... *G06F 21/62* (2013.01); *G06F 21/6209* (2013.01); *G06F 21/6218* (2013.01); *H04L 9/0861* (2013.01); *H04L 9/0894* (2013.01); *H04L 9/14* (2013.01)

(58) Field of Classification Search
 CPC ...... G06F 21/60; G06F 21/62; G06F 21/6218; G06F 21/6209; H04L 6/0428; H04L 6/10; H04L 6/101; H04L 9/14; H04L 9/08; H04L 9/0861; H04L 9/0894; H04L 9/0822
 See application file for complete search history.

(56) References Cited

U.S. PATENT DOCUMENTS

| | | | | |
|---|---|---|---|---|
| 5,222,136 | A * | 6/1993 | Rasmussen | H04L 9/0822 380/43 |
| 10,326,744 | B1 * | 6/2019 | Nossik | H04L 63/0435 |
| 11,934,322 | B1 * | 3/2024 | Miller | G06F 3/061 |
| 2011/0225423 | A1 * | 9/2011 | Lynch | H04L 63/04 713/171 |
| 2019/0253244 | A1 * | 8/2019 | Hamel | H04L 9/14 |

(Continued)

OTHER PUBLICATIONS

"Introduction to Transparent Data Encryption", Database Advanced Security Guide, Retrieved from https://docs.oracle.com/database/121/ASOAG/introduction-to-transparent-data-encryption.htm#ASOAG10117, Retrieved on Jul. 5, 2023, p. 6.

(Continued)

*Primary Examiner* — Shaqueal D Wade-Wright
(74) *Attorney, Agent, or Firm* — Invoke

(57) ABSTRACT

Operations include: receiving a first request for a first dataset of a plurality of datasets stored in a particular database instance; obtaining an encrypted version of the first dataset; obtaining an encrypted version of the first DEK; requesting decryption of the encrypted version of the first DEK; receiving a decrypted version of the first DEK; applying the first DEK to the encrypted version of the first dataset to obtain a decrypted version of the first dataset; and transmitting the decrypted version of the first dataset. The first dataset is encrypted by a first DEK associated with a first tenant. A second dataset is encrypted by a second DEK associated with a second tenant. The decrypted version of the first DEK is generated by applying a first MEK of the first tenant to the encrypted version of the first DEK.

21 Claims, 7 Drawing Sheets

(56) References Cited

U.S. PATENT DOCUMENTS

2019/0318102 A1* 10/2019 Araya ................ H04L 9/0897
2021/0377033 A1* 12/2021 Teran Guajardo .... H04L 67/146

OTHER PUBLICATIONS

"Open Search", . . . Retrieved from https://opensearch.org/, 2023, pp. 34.

"Transparent data encryption", Retrieved from https://learn.microsoft.com/en-US/sql/relational-databases/security/encryption/transparent-data-encryption?view=sql-server-ver16, Mar. 4, 2023, p. 14.

"Use OCI Search Service with OpenSearch to build in-application search", Retrieved from https://docs.oracle.com/en/solutions/oci-opensearch-application-search/#GUID-AEAA600E-BBCC-4102-8E23-ABEC941FE84C, May 9, 2022, p. 3.

* cited by examiner

MULTI-TENANT FILE-LEVEL ENCRYPTION FOR INDEX BASED DATABASE

TECHNICAL FIELD

The present disclosure relates to a software search and analytics application of a database encrypted by file-level encryption, such as transparent data encryption (TDE).

BACKGROUND

Existing open-search software suites can be used for searches, analytics, and observability applications, such as database searching applications, for example. Certain open-search software suites provide customers with vendor-managed open-search instances on demand. In some cases, searches are performed on databases encrypted by TDE.

TDE is a security feature that typically provides encryption at the database file level. It is designed to protect data stored in a database by automatically encrypting the data as it is written to disk and decrypting it when read from disk, thus making the encryption process transparent to applications and users. In the existing technology, the TDE encryption is dependent on the medium of storage (e.g. block volume/object storage) as opposed to data encryption support by the application which is independent of the storage medium.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
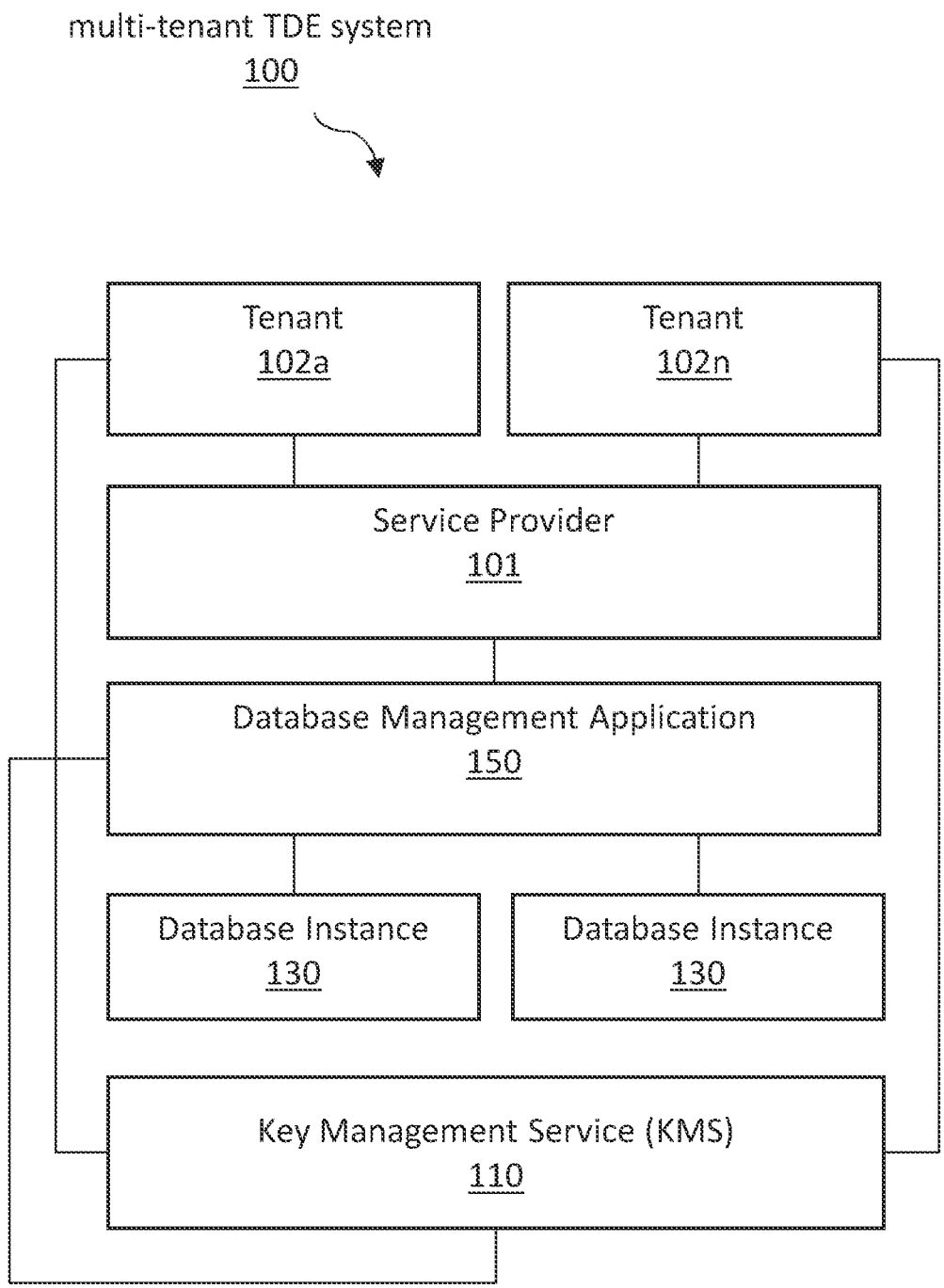
FIG. 1A illustrates an example of a system for multi-tenant TDE.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Multi-Tenant TDE System That Applies a KMS Vault System
3. Steps of the Multi-Tenant TDE System Operations
4. Hardware Overview

1. General Overview

One or more embodiments implement a multi-tenant database instance where each tenant's data is encrypted using a tenant-specific data encryption key (DEK). The tenant-specific data encryption key is itself encrypted using a Master Encryption Key (MEK) that is unavailable to a database management application that maintains the multi-tenant database instance. The database management application temporarily obtains an unencrypted DEK for each session. The database management application may encrypt and decrypt data for the tenant, during the session, using the unencrypted DEK. The unencrypted DEK is typically stored in temporary memory such as Random Access Memory (RAM) for the duration of the session. The database management application discards the unencrypted DEK upon termination of the session.

Obtaining the unencrypted DEK includes transmitting a request to a Key Management Service (KMS) that is controlled by the tenant and that maintains the MEK. The request to the KMS includes the encrypted DEK. The KMS decrypts the encrypted DEK to obtain the unencrypted DEK and returns the unencrypted DEK to the database management application for use during the session.

Advantageously, the system allows for implementation of a multi-tenant database instance where each tenant maintains access control for its respective data within the multi-tenant database instance. The tenant provides temporary access to its dataset for execution of operations during a session by decrypting the DEK for temporary storage by the database management application. If access to the encrypted data and encrypted DEK is gained by an unauthorized entity, the unauthorized entity is unable to decrypt the encrypted DEK or the encrypted data due to the MEK being separately maintained by the KMS and isolated from the encrypted DEK and encrypted data.

One or more embodiments described in this Specification and/or recited in the claims may not be included in this General Overview section.

2. Multi-Tenant TDE System That Applies a KMS Vault System

A multi-tenant database instance may be secured using file-level encryption, such as transparent data encryption (TDE). TDE may use symmetric key encryption to encrypt the data stored in database files. The encryption and decryption may be performed at the page level, i.e., individual data pages within the database file may be encrypted. TDE may use data encryption keys (DEKs) to encrypt and decrypt the data, and the keys may be protected by a certificate stored in the database or by a master key.

TDE may operate transparently to applications and users. In one embodiment of the present application, once TDE is enabled for a database, data written to the database may be automatically encrypted before it is stored on disk. When the data is read from disk, it may be decrypted on the fly, allowing applications and users to access the data. TDE may protect data at rest, which means the data stored on disk or in backups. TDE may prevent unauthorized access to the data in case the physical storage media or backup files are compromised.

TDE is implemented at the database management system level and is supported by various database platforms such as Oracle Database, Microsoft SQL Server, and MySQL, among others. TDE may help address security and compliance requirements by providing an additional layer of data protection by ensuring that even if an attacker gains unauthorized access to the database files, the encrypted data remains unintelligible without the appropriate encryption keys.

In one embodiment of the present application, customers achieve TDE by leveraging an envelope encryption pattern used by KMS. Customers may create encrypted indexes from a KMS vault or other KMS providers while at the same time benefitting from transparently reading and writing to their data. As a result, a "bring your own key" (BYOK) solution may be provided for a TDE database configuration.

Certain embodiments of the present application relate to a multi-tenant database instance for a customer, where each tenant's data is encrypted using a tenant-specific encryption key. In order to implement a multi-tenant database instance for a customer where each of the customer's tenants have control over access to their respective datasets, an embodiment of the present application implements a dual key system including a Data Encryption Key (DEK) and a Master Encryption Key (MEK) per tenant. The DEK may be used to encrypt/decrypt a tenant's data. The tenant-controlled MEK may be used to decrypt the DEK that is stored in random access memory (RAM) for a session and may be deleted thereafter.

In one embodiment, metadata associated with a database instance serves as a manifest for the keys relevant to the files in that database instance. Specifically, when a data request for a particular tenant's data is received from a customer, the system may identify the encrypted data, and an encrypted version of a DEK that was used to encrypt that data. The DEK may itself be encrypted with the MEK. The encrypted DEK and an endpoint associated with a MEK holder (e.g., KMS vault) may both be identified in metadata associated with requested data.

In another embodiment, the system requests decryption of the DEK by a KMS that maintains the MEK in a tenant-specific vault that is controlled by the tenant. If a customer's tenant has granted access to a customer, the KMS will use the tenant's MEK to decrypt the DEK. The system may then use the decrypted DEK to decrypt the customer's tenant data and return the decrypted data to the customer. The decryption and data retrieval may be performed on a per-block basis (rather than a per-file basis). Furthermore, once the DEK has been decrypted using the MEK, it can be repeatedly used during a session to decrypt various datasets.

FIG. 1A illustrates a multi-tenant file-level encryption system, such as transparent data encryption (TDE) system 100 configured to leverage an envelope encryption pattern used by the Key Management Service (KMS) vault 110. The multi-tenant TDE system 100 allows customers to create encrypted indexes in a data management application 150 while at the same time benefiting from transparently reading and writing to their data, supporting multi-tenant TDE.

The multi-tenant TDE system 100 allows customers to have multi-tenant clusters with various indexes each encrypted with a separate encryption key. Accordingly, customers, i.e., service providers 101, can use different encryption keys for each index or a set of documents. This feature eliminates a need to spin different clusters for each such set of indices, thereby avoiding significant overhead. The multi-tenant TDE system 100 may avoid exfiltration regardless of the storage medium and whether it supports full disk encryption or object storage or another transparent encryption. The individual components of the multi-tenant TDE system 100 and their relations will be explained in greater detail below.

In one embodiment, the multi-tenant TDE system 100 includes one or more tenants 102, which use services of a service provider 101, a database management application 150 that manages one or more database instances 130, and a KMS vault 110. The TDE system 100 may include additional providers that may be on the same or different clouds.

In order to provide details for the multi-tenant TDE system 100, a database instance 130 will be separately discussed with respect to FIG. 1B, and a KMS 110 vault system will be explained by referring to FIG. 1C.

Figure 1B:
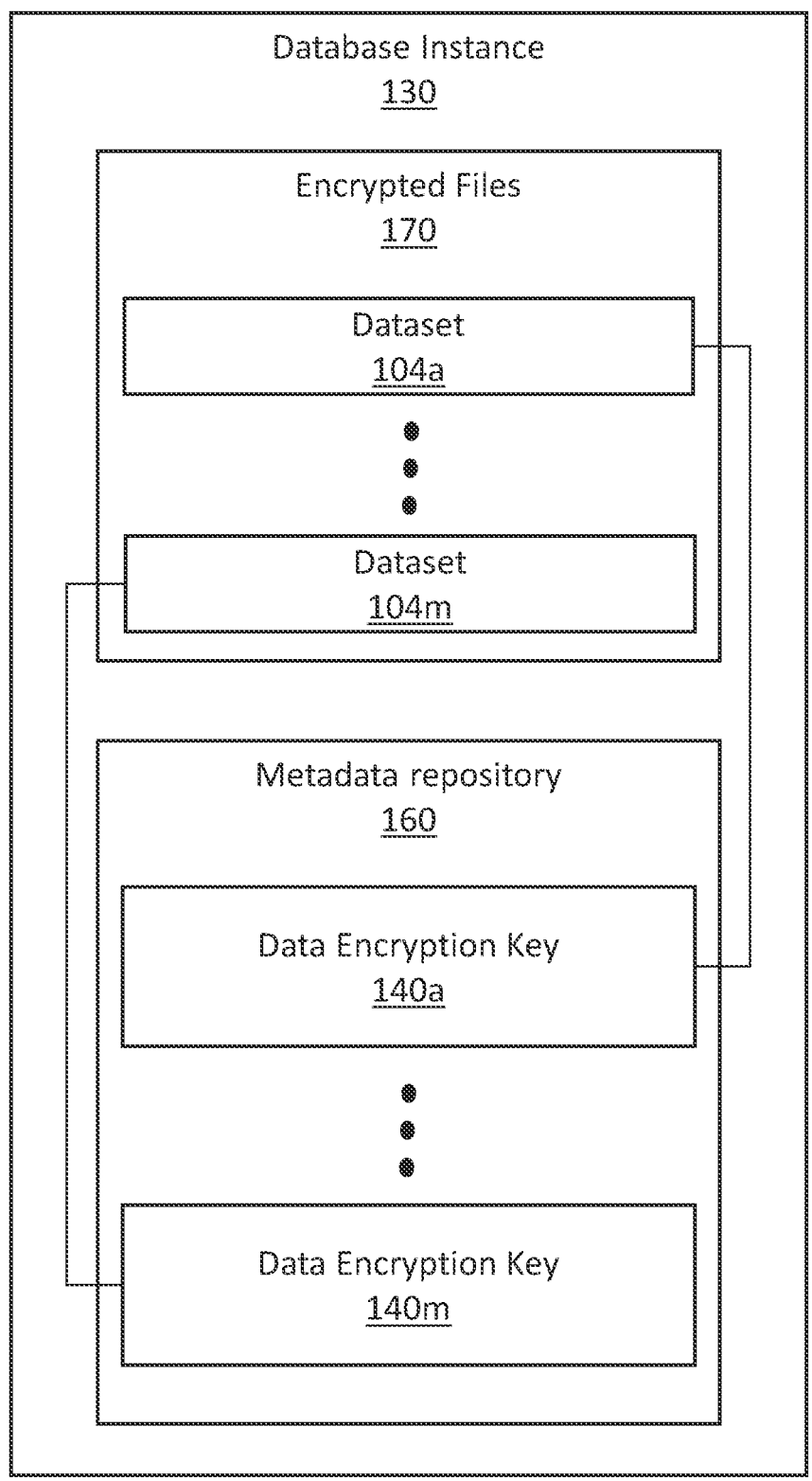
FIG. 1B illustrates an example of a database instance of a multi-tenant TDE system.

As shown in FIG. 1B of the present application, one embodiment of database instance 130 includes encrypted files 170 and a metadata repository 160. Encrypted files 170 may be encrypted by TDE that is enabled for the database instance 130. Data written to database instance 130 may be automatically encrypted before it is stored on disk. When the data is read from disk, it may be decrypted on the fly, allowing applications and users to access the data. TDE may protect data at rest, which means the data stored on disk or in backups. TDE may prevent unauthorized access to the data in case the physical storage media or backup files are compromised.

In one embodiment of the present application, the encrypted files 170 may belong to multiple tenants 102 (102a-102n). Each of the tenants 102 may own a dataset 104. Moreover, the metadata repository 160 may include various types of metadata, among which may be data encryption keys (DEKs) 140. Each of the DEKs 140 (140a-140m) may encrypt a portion of the encrypted files 170, specifically, a dataset 104 owned by one of the tenants 102 that is encrypted by a particular DEK 140. Therefore, in one embodiment, in order to access the particular dataset 104 owned by the tenant 102, the corresponding DEK 140 must be used for decryption of the dataset 104. At the same time, however, the DEK 140 may be encrypted by a master encryption key (MEK), which may be stored elsewhere. In one embodiment, this technique of using DEKs 140 for symmetric encryption of datasets 140 and then using MEKs for an asymmetric encryption of the corresponding DEKs 140 is referred to as envelope encryption.

Figure 1C:
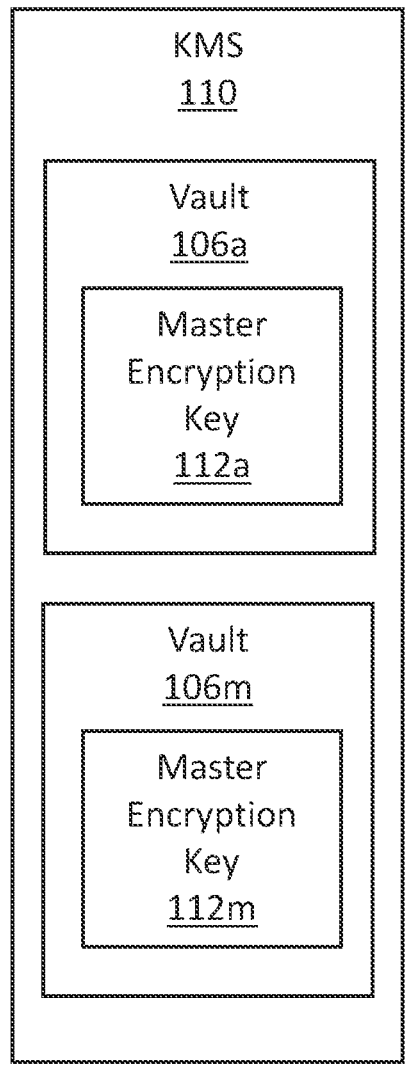
FIG. 1C illustrates an example of a Key Management Service (KMS) vault system.

FIG. 1C of the present application shows an embodiment of a KMS 110 vault system. The KMS 110 vault system may include multiple vaults 106 (106a-106m) that belong to multiple tenants 102, i.e. one vault 106 per tenant 102. Each of the vaults 106 may include a master encryption key (MEK) 112. Each of the MEKs 112 (112a-112m) may be used to decrypt its corresponding DEK 140 in the metadata depository 160 of a database instance 130.

As shown in FIG. 1A, a tenant 102 may send a request to a device of a service provider 101 to access encrypted data, i.e., a portion of encrypted files 170 in a database instance 130 that belongs to the specific tenant 102. At this point, the multi-tenant TDE system 100 may provide a decryption function as well as an isolation function of the data among multiple tenants 102 in the manner discussed next.

In one embodiment of the present application, the database management application 150 sends (based on a request from the service provider 101), a request to the KMS 110 vault system, seeking a MEK 112 of a vault 106 that belongs to a particular tenant that requested the decryption from the service provider 101. As a result, the KMS 110 may provide the MEK 112 for that particular tenant (e.g., tenant 102a), and no other tenant (e.g., tenant 102n). Such a separation of vaults 106/MEKs 112 among the tenants 102 allows for the isolation of the datasets 104 that belong to different tenants 102 because the particular obtained MEK 112 may be capable of decrypting its corresponding DEK 140, and no other DEK 140.

Next, the MEK 112 may be applied by the database management application 150 and used for a desired database instance 130 that includes still encrypted datasets 104 of the requesting tenant 102. In one embodiment, an envelope decryption commences by the obtained MEK 112 being matched with its corresponding DEK 140 for the particular tenant 102, where the MEK 112 asymmetrically decrypts the DEK 140 of the metadata repository 160. The DEK 140 may be stored as unencrypted metadata in the metadata repository 160 for the matching of the MEK 112 and the DEK 140 to occur, when the decryption of DEK 140 may take place. Accordingly, the decrypted DEK 140 may be available to the database management application 150 for the second and symmetrical stage of the envelope decryption.

In one embodiment, the symmetrical stage of the envelope decryption is performed by applying the, now decrypted, DEK 140 to a specific portion of the encrypted files 170 of the database instance 130. Specifically, the DEK 140 may decrypt the dataset 104 of the database instance 130 that belongs to the tenant 102. In this manner, the envelope decryption may be completed, while preserving the isolation of the data that belongs to other tenants 102 from the requesting tenant 102. Consequently, the dataset 104 of the requesting tenant 102 may be decrypted and ready to be sent to the tenant 102, and the transmission of the dataset 104 may occur. Of note, the dataset 104 may be subsequently encrypted in transit by a technique other than TDE.

The vaults 106 allow secure storage of MEKs 112. Specifically, depending on the protection mode, the MEKs 112 may either be stored on the server or they may be stored on hardware security modules (HSM) that meet Federal Information Processing Standards (FIPS) 140-2 Security Level 3 security certification.

The vaults 106 of the KMS 110 may be logical entities where the KMS 110 creates and durably stores vault MEKs 112. The type of vault 106 may determine features and functionality such as degrees of storage isolation, access to management and encryption, scalability, and/or the ability to back up.

In one embodiment, MEK cryptographic material is generated for a specific algorithm that allows usage of the MEK 112 for encryption or in digital signing. When used for encryption, a key or key pair may encrypt and decrypt data, thus protecting the data where the data is stored or while the data is in transit. Each MEK 112 may be automatically assigned a key version. When a MEK 112 is rotated, the vault 106 service may generate a new key version. The KMS 110 can generate the key material for the new key version.

The key encryption algorithms that the KMS 110 supports may include the Advanced Encryption Standard (AES), the Rivest-Shamir-Adleman (RSA) algorithm, and/or the elliptic curve digital signature algorithm (ECDSA). One embodiment of the present application creates and uses AES symmetric keys and RSA asymmetric keys for encryption and decryption. Another embodiment uses RSA or ECDSA asymmetric keys for signing digital messages.

In one embodiment, the KMS 110 performs cryptographic operations using the stored keys. This includes encrypting and decrypting data, signing and verifying digital signatures, generating secure random numbers, and other cryptographic functions. The KMS 110 may enforce access control mechanisms to ensure that only authorized users or applications can manage and use the stored keys. Access policies and permissions can be defined to control who can create, read, update, or delete keys and secrets within the vault.

The KMS 110 provides auditing and logging capabilities to track key usage, operations, and changes. This helps with compliance requirements, security monitoring, and investigation of potential security incidents. By utilizing the KMS 110, organizations can centralize the management and security of their cryptographic assets, ensuring that sensitive data is properly protected. This system helps to enforce security best practices, simplifies key management tasks, and provides a secure and auditable solution for cryptographic operations.

Figure 2:
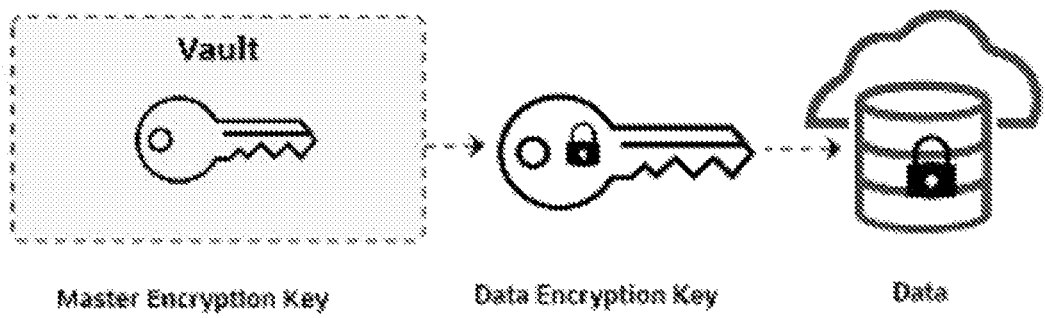
FIG. 2 illustrates a schematic of an envelope encryption technique.

In one embodiment of the present application, the DEK 140 is protected by envelope encryption, shown in FIG. 2 of the present application. Envelope encryption may be used to enhance data security by combining the benefits of both symmetric and asymmetric encryption algorithms, and it allows for sensitive data to be stored securely while allowing efficient access and encryption/decryption operations.

In one embodiment, a combination of symmetric and asymmetric encryption is used. Specifically, a unique symmetric DEK 140 is generated for each piece of sensitive data that needs to be encrypted. The DEK 140 may be a randomly generated cryptographic key that is used for the actual encryption and decryption of the data.

In another embodiment of the present application, the DEK 140 is encrypted using an asymmetric encryption algorithm, such as RSA or ECDSA. The public key associated with a recipient, or a target system, may be used for the encryption process. Asymmetric encryption provides secure key exchange and ensures that only the intended recipient with the corresponding private MEK 112 can decrypt the DEK 140.

The encrypted DEKs 140, along with the encrypted data, may be stored in a secure storage system, such as a database instance 130. Upon request, this storage system can be accessed by the service provider 101 that may apply the MEKs 112 to retrieve and decrypt the data.

In yet another embodiment, when data needs to be accessed or decrypted, the encrypted DEK 140 corresponding to that data is retrieved from the storage system. The recipient or target system possessing the MEK 112 (private key) associated with the encryption key pair may decrypt the DEK 140 using the corresponding MEK 112, thus obtaining the original symmetric DEK 140.

In an embodiment of the present application, with the decrypted DEK 140, the symmetric encryption algorithm (e.g., AES) is used to encrypt or decrypt the sensitive data. This symmetric encryption/decryption process may be performed using the DEK 140, which may be in its original form.

By using the envelope encryption technique, the performance overhead associated with asymmetric encryption may be reduced, as symmetric encryption is used for the actual data encryption. One advantage of asymmetric encryption is that it allows for secure key exchange without requiring the transmission of the symmetric DEKs 104. Envelope encryption may provide an additional layer of security by ensuring that even if the storage system is compromised, an attacker cannot directly access the sensitive data. The encrypted DEKs 140 may provide an extra level of protection, and the symmetric DEKs 104 may be decrypted in a trusted and authorized environment.

The KMS 110 vault system can exercise the following lifecycle management features for vaults 106 and MEKs 112, thereby assisting in controlling resources and access them: creating vaults 106; creating or importing cryptographic material as MEKs 112; enabling or disabling MEKs 112 for use in cryptographic operations; rotating MEKs 112 to generate new cryptographic material; exporting key or vault metadata to a backup that can be restored and used again later; continuously replicating a vault 106 and its keys to another region in the realm; and/or tagging vaults 106 and MEKs 112 to add metadata to resources, delete vaults 106, or MEKs 112, when they are no longer needed, etc.

The envelope encryption technique may be used to perform: encryption and decryption of data while at rest, signing messages and verify signed messages, assigning keys to supported infrastructure resources, including, but not limited to, buckets and file systems, generating DEKs 140, etc.

Figure 3:
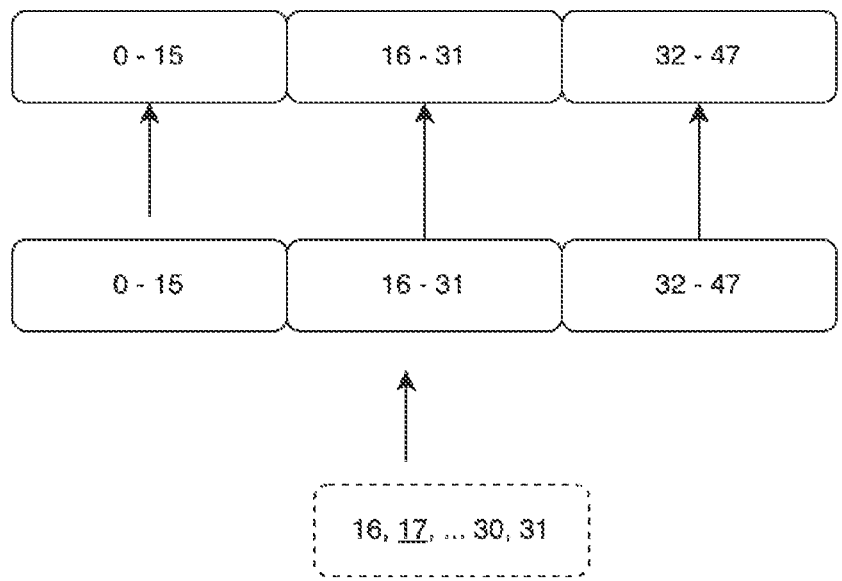
FIG. 3 illustrates an example of random access on an index file.

For every encrypted file 170 written to a database instance 130, the multi-tenant TDE system 100 may maintain a metadata entry stored together with the file that will provide the metadata required to decrypt the file 170. The encrypted files may require support for random access for which AES (symmetric encryption algorithm) and may be used in counter mode (CTR). Certain Lucene files may be suitable for random access, and, therefore, AES CTR (counter mode) algorithm may be used. As depicted in FIG. 3 of the present application, AES CTR may operate in blocks of 16 bytes when encrypting/decrypting. AES CTR may further require a combination of unique initialization vector (IV)+DEK 140 for each file encrypted, hence, if all DEKs 140 are different all Ivs may be the same and vice versa.

Figure 4:
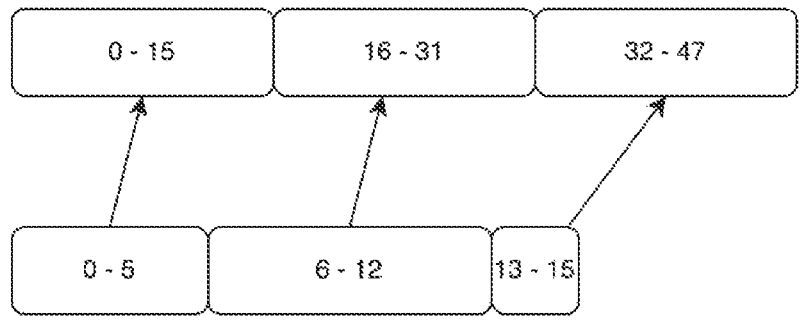
FIG. 4 illustrates another example of random access on an index file.

FIG. 3 is an example of random access with AES CTR on a Lucene index file, where the file encrypted in blocks is the same length as the original file. In one embodiment, Lucene segment index file is created by dividing original file offset segments 0-47 into three groups (0-15, 16-31, and 32-47) resulting in three groups of AES CTR encrypted blocks (0-15, 16-31, and 32-47). In this example, random access offset 17 requires calculating the IV of block 16-31 and adding it to the cipher while reading. In another example, shown in FIG. 4, the file encrypted in blocks is not the same length as the original file.

In one embodiment, combination of IV+DEK 140 is unique. Since IV is a 32 bit integer, there is a limitation of 2^32 unique IVs for a single DEK 140. If the amount of 2^32 unique IVs is exceeded for a single DEK 140, an IV collision may occur which may nullify the encryption effectiveness. With the AES CTR technique, random access can be achieved, and data can be decrypted from a specific offset position.

Further, a corresponding metadata entry for each file may be kept that includes the following information: file name (a path or unique ID of the file by which it is globally identified), IV (an initialization vector used for the file encryption), and DEK ID (ID of the DEK 140 used to encrypt the file).

In one embodiment, each DEK 140 has the following corresponding metadata entry associated with it: DEK ID, DEK Cipher text (the DEK 140 in encrypted form), MEK OCID, and vault crypto endpoint. Of note, in instances when metadata fields are not secrets, if they become available to a system attacker, the decryption of the data may not be allowed, unless access is granted to KMS API to decrypt the DEK 140, due to the envelope encryption shown in FIG. 2 of the present application.

In another embodiment, the encryption metadata is stored either on an external metadata store or locally on the same file system directory as the data file itself. In yet another embodiment, the entire encryption metadata can be written to the header of each encrypted file.

Moreover, metadata may be included in the encrypted file header. In one embodiment of the present application, the metadata itself is not encrypted, but the rest of the file is. In yet another embodiment, the file name is not present in the metadata.

One of the advantages of storing all metadata within the file header is the case of locating the file metadata, which may be suitable for atomic transactions such as file rename/delete/copy. This technique enables those transactions to be performed without any synchronization with metadata. In such instances the file name may not be included in the metadata as the file name is already self-described.

One embodiment of the present application includes a separate metadata file, where for each encrypted file there is a corresponding metadata file that will include the metadata information. For each DEK 140 there may be a corresponding metadata file in a separate file entry. In this manner it is possible to normalize references to DEK ID while avoiding data duplication.

Including a separate metadata file facilitates performing metadata version migrations and managing backwards compatibility. This technique also eliminates redundancy among DEK cipher text for smaller files.

DEK rotation policy may be defined by the customer upon index creation. In one embodiment, MEK 112 can be rotated by the customer at any time on their vault. DEK 140 may be automatically rotated when required to avoid reaching the IV collision limit of 2^32, for example. In the instance where the IV collision limit is 2^32, this limit requires that a single DEK 140 encrypts 2^32 files to reach it. In order to avoid reaching the limit, one embodiment of the present application initially generates IV randomly, with the generation number of the shard that automatically increments with each commit.

A customer may create a vault 106 and a MEK 112 within the KMS vault. When creating an index, the customer may indicate that this is an encrypted index and may point it to the KMS 110 vault crypto endpoint and to the MEK OCID to use. From that moment, the customer write operations to this index may be encrypted, and in order to decrypt them, it is necessary to access the vault 106 and the MEK 112.

Below is an example of a customer creating an encrypted index with the BYOK feature:

```
PUT /my-index-000001
{
    "settings": {
        "index": {
            "number_of_shards": 3,
            "number_of_replicas": 2,
            ...
    "  "t"pe": "encryp"ed",
    "  "key_provi"er": "oci_"ms",
    "  "crypto_endpo"nt": "https://b5ry4jcnaaefo-crypto.kms.us-ashburn-1.oraclecloud."om",
    "  "mek_o"id":
"ocid1.key.ocl.iad.b5ry4jcnaaefo.abuwcljrucfipheqxptrdojgp6kyoc4mj4x75gx5sudsursnyhz2br7cx"tq"
        }
```

```
    }
  }
```

The database 130 may include one or more files 170 in accordance with one or more embodiments. The files may be encrypted and decrypted at rest. i.e., on write/read with TDE. The database 130 may further include a metadata repository 180, where for every file written to disk (e.g., F1, F2, F3, etc.) the multi-tenant TDE system 100 maintains a metadata entry stored together with the file (e.g., Key 1, Key 2, Key 3, etc.) that provides the metadata required to decrypt the file.

In one embodiment, the DEK 140 is stored in random access memory (RAM) for a session and may be deleted thereafter. When a query comes in, a data node distributes the query to each shard of an index system in the database instance 130 and translates it into a query expression. In turn, the index system may rewrite the query and evaluate it into the relevant segments and file chunk positions to be read. The index system may further assume that each file is organized in a structure with capability to jump between positions, for example in instances of binary search or galloping search or otherwise in instances of encoding the chunk size and the relative positional distance to the next offset.

One embodiment of the present application maintains the mapping between the original file positions that the original data structure is expecting, to the encrypted file content in which positions might be offset in a random way. In one instance, this deterministic positional random access is achieved by full decryption and caching in memory. Specifically, this technique may involve decrypting the entire file, loading it to memory and leveraging an implementation of RAM directory in the index system to read it. This technique may allocate some RAM as a buffer to hold on to the decrypted segments in memory and the customer may be able to tune it as needed to optimize performance and avoid unnecessary disk IO.

In another instance, this deterministic positional random access is achieved by block mapping, which allows for the mapping between the AES encrypted file blocks to chunks of the index system. The block mapping may be loaded in memory and leveraged when accessing each one of the files. The block mapping may further include a static translation layer that can avoid holding as little block mapping in memory as possible. One embodiment of the present application avoids the creation of another layer of positional mapping by leveraging AES CTR mode which allows retention of 1:1 mapping thereby providing a sufficiently secure cipher. The block mapping technique may apply buffering when it is desired to avoid the decryption operations from happening, thereby saving some of the latent CPU costs in the process.

3. Steps of the Multi-Tenant TDE System Operations

Figure 5:
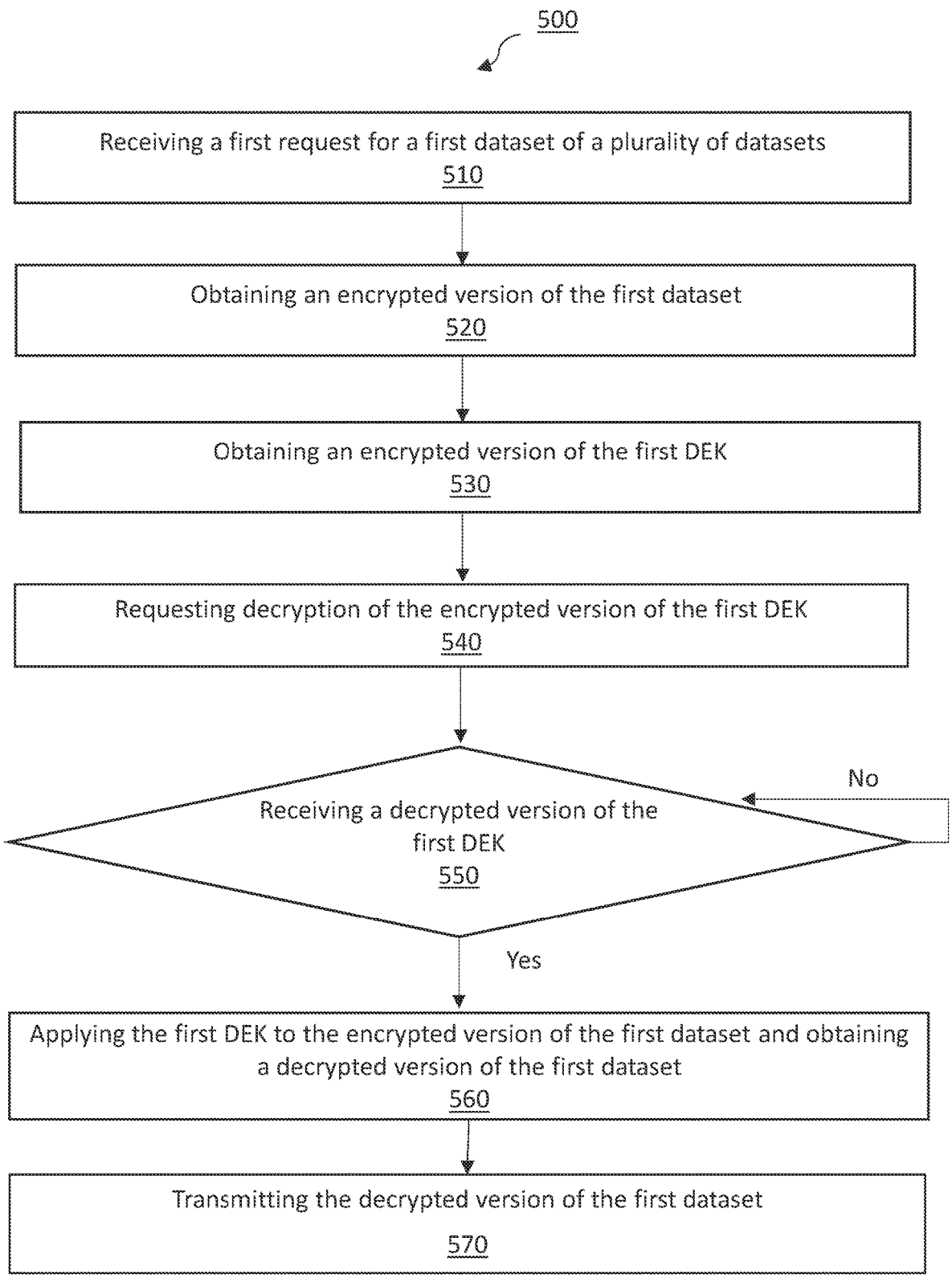
FIG. 5 illustrates an example of steps of a multi-tenant TDE operation.

FIG. 5 of the present application shows an embodiment of method steps of a multi-tenant TDE operation 500.

In step 510, a request for a dataset 104, such as encrypted files 170 of an index stored in the database instance 130 is received from a device of a service provider 101, as shown in FIGS. 1A and 1B of the present application. The files 170 of the database instance 130 may be encrypted by TDE. The dataset 104 may be associated with a (first) tenant 102 that owns MEK 112 in a vault 106 of the KMS 110, as illustrated in FIG. 1C of the present application. In another embodiment, the vaults 106 may be provided by a provider different from the service provider 101.

The requested dataset 104 may be encrypted by a DEK 140 associated with the (first) tenant 102 and stored in the metadata repository 160 of the database instance 130. The first tenant may be associated with the index number 1 of the database 130, for example. Further, another (second) dataset 104 may be encrypted by another (second) DEK 140 associated with another (second) tenant 102. The second tenant 102 may be associated with index number 2 of the database instance 130, for example.

In step 520, an encrypted version of the first dataset 104, such as encrypted files 170 of index number 1, may be obtained from the database instance 130. The encrypted index number 1 that includes the first dataset 104 may be encrypted at rest, and by the symmetric portion of the envelope encryption technique, i.e., by the first DEK 140 stored in the metadata repository 160.

Subsequently, in step 530, an encrypted version of the first DEK 140 may be obtained. In one embodiment, the first DEK 140 is stored in the metadata repository 160 as unencrypted metadata. The unencrypted metadata may be stored in temporary memory such as Random Access Memory (RAM) for the duration of a session. The database management application 150 discards the unencrypted metadata upon termination of the session.

In step 540, decryption of the encrypted version of the first DEK 140 may be requested. In one embodiment, the service provider 101 may request a first MEK 112 from a first vault 106 in the KMS 110 vault system. The first MEK 112 may belong to the first tenant 102 that previously requested the first dataset 104 that belongs to the first tenant 102. The first MEK 112 may correspond to the first DEK 140, which is provided to the database management application 150, which may locate and decrypt the first DEK 140 in the metadata repository 160. Consequently, the first stage of the envelope decryption may be asymmetrically performed, where the privately owned first MEK 112 decrypts the public first DEK 140. In one embodiment, the decrypted version of the first DEK 140 may be generated based on authorization by the first tenant 102 to decrypt the encrypted version of the first DEK 140.

As a result, a decrypted version of the first DEK 140 may be received in step 550. In one embodiment, the decrypted version of the first DEK 140, generated by applying the first MEK 112 may result from identifying metadata from the metadata repository 160 associated with the first DEK 140, i.e., with the index number 1. The identified metadata may be used to find an endpoint for the vault 106 of the KMS 110 that stores the first MEK 112 of the index number 1 of the first tenant 102. A request to decrypt the encrypted version of the first DEK 140 may be transmitted to the endpoint for the vault 106 of the KMS 110. The consequently received DEK 140, as decrypted, may be used next in the second stage of the envelope decryption process.

In step 560, the decrypted first DEK 140 associated with the first tenant 102 may be applied to the encrypted version of the first dataset 104 of the index number 1 among the encrypted files 170. In this manner, a decrypted version of the first dataset 104 may be obtained. The first dataset 104 may include a particular data block in a file. Moreover, the first DEK 140 may be applied to an encrypted version of the particular data block without being applied to encrypted versions of other data blocks in the file. In one embodiment, once the decrypted version of the first DEK 140 is received, the first DEK is repeatedly applied during a session to decrypt various datasets 104.

Lastly, in step 570, the decrypted version of the first dataset 104 associated with the index number 1 may be transmitted to the first tenant 102. The first dataset 104 may be subsequently encrypted in transit by a technique other than TDE.

Figure 6:
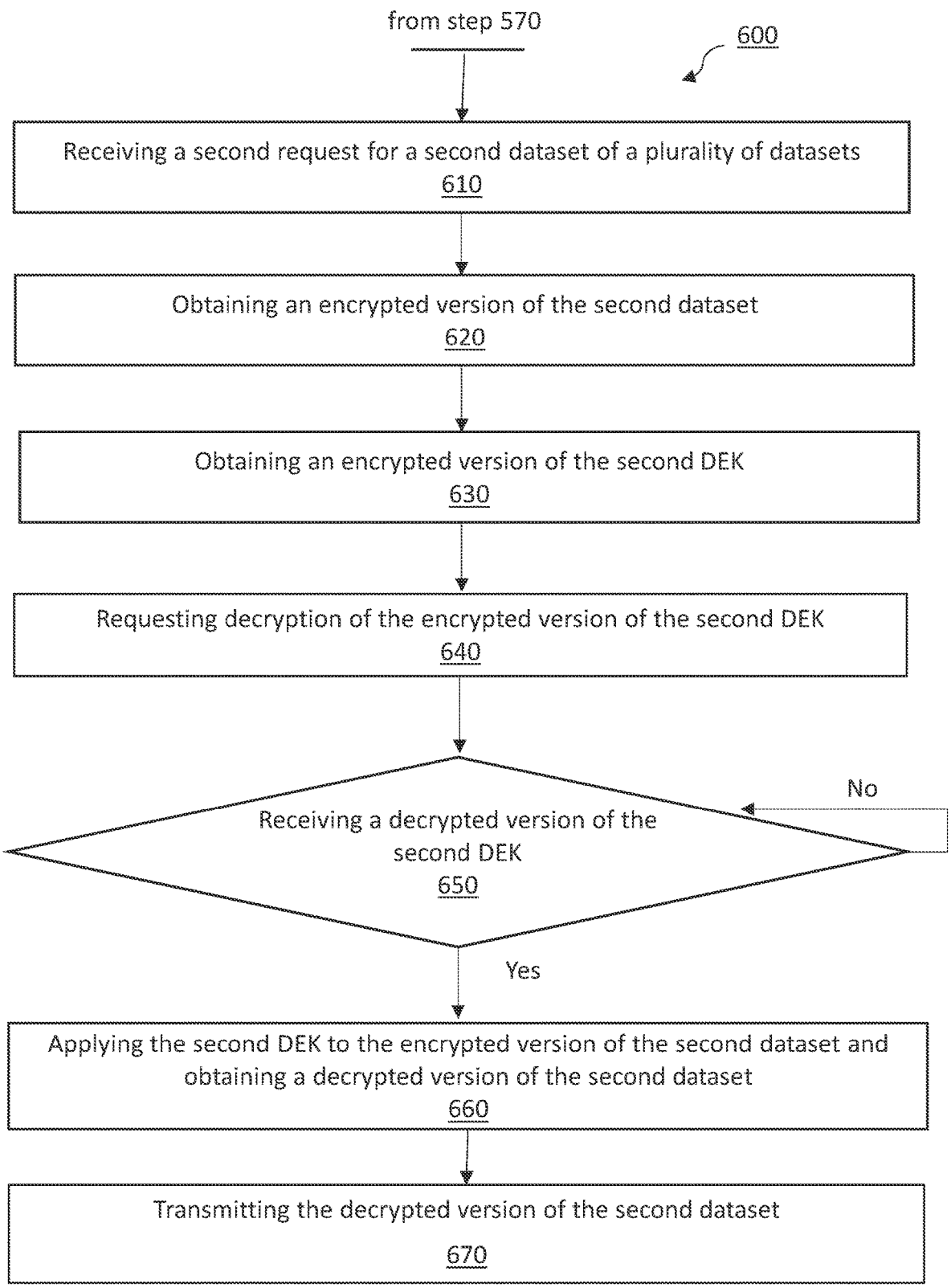
FIG. 6 illustrates another example of steps of a multi-tenant TDE operation.

FIG. 6 of the present application shows an embodiment of method steps of a multi-tenant TDE operation 600, which continues from step 570 of the multi-tenant TDE operation 500.

In step 610, a request for a dataset 104, such as encrypted files 170 of an index stored in the database instance 130 is received from a device of a service provider 101, as shown in FIGS. 1A and 1B of the present application. The database instance 130 may be encrypted by TDE. The dataset 104 may be associated with a second tenant 102 that owns MEK 112 in a vault 106 of the KMS 110, as illustrated in FIG. 1C of the present application. In another embodiment, the vaults 106 may be provided by a provider different from the service provider 101.

The requested dataset 104 may be encrypted by a DEK 140 associated with the second tenant 102, and stored in the metadata repository 160 of the database instance 130. The second tenant may be associated with index number 2 of the database 130, for example.

In step 620, an encrypted version of the second dataset 104, such as encrypted files 170 of index number 2, may be obtained from the database instance 130. The encrypted index number 2 that includes the second dataset 104 may be encrypted at rest, and by the symmetric portion of the envelope encryption technique, i.e., by the second DEK 140 stored in the metadata repository 160.

Subsequently, in step 630, an encrypted version of the second DEK 140 may be obtained from the metadata repository 160. The metadata in the repository 160 may be stored in temporary memory such as Random Access Memory (RAM) for the duration of a session. The database management application 150 may discard the metadata upon termination of the session. In one embodiment, the metadata in the repository 160 is stored unencrypted, other than the DEK 140, which is encrypted.

In step 640, decryption of the encrypted version of the second DEK 140 may be requested. In one embodiment of the present application, the service provider 101 may request a second MEK 112 from a second vault 106 in the KMS 110 vault system. The second MEK 112 may belong to the second tenant 102 that previously requested the second dataset 104 that belongs to the second tenant 102. The second MEK 112 may correspond to the second DEK 140, thereby finding and decrypting the second DEK 140 in the metadata repository 160. Consequently, the first stage of the envelope decryption may be asymmetrically performed, where the privately owned second MEK 112 decrypts the public second DEK 140. In one embodiment, the decrypted version of the second DEK 140 may be generated based on authorization by the second tenant 102 to decrypt the encrypted version of the second DEK 140.

As a result, a decrypted version of the second DEK 140 may be received in step 650. In one embodiment, the decrypted version of the second DEK 140, generated by applying the second MEK 112 may result from identifying metadata from the metadata repository 160 associated with the second DEK 140, i.e., with the index number 2. The identified metadata may be used to find an endpoint for the vault 106 of the KMS 110 that stores the second MEK 112 of the index number 2 of the second tenant. A request to decrypt the encrypted version of the second DEK 140 may be transmitted to the endpoint for the vault 106 of the KMS 110. The consequently received DEK 140, as decrypted, may be used next in the second stage of the envelope decryption process.

In step 660, the decrypted second DEK 140 associated with the second tenant 102 may be applied to the encrypted version of the second dataset 104 of the index number 2 among the encrypted files 170. In this manner, a decrypted version of the second dataset 104 may be obtained. The second dataset 104 may include a particular data block in a file. Moreover, the second DEK 140 may be applied to an encrypted version of the particular data block without being applied to encrypted versions of other data blocks in the file. In one embodiment, once the decrypted version of the second DEK 140 is received, the second DEK is repeatedly applied during a session to decrypt various datasets 104.

Lastly, in step 670, the decrypted version of the second dataset 104 associated with the index number 2 may be transmitted to the second tenant 102. The second dataset 104 may be subsequently encrypted in transit by a technique other than TDE.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
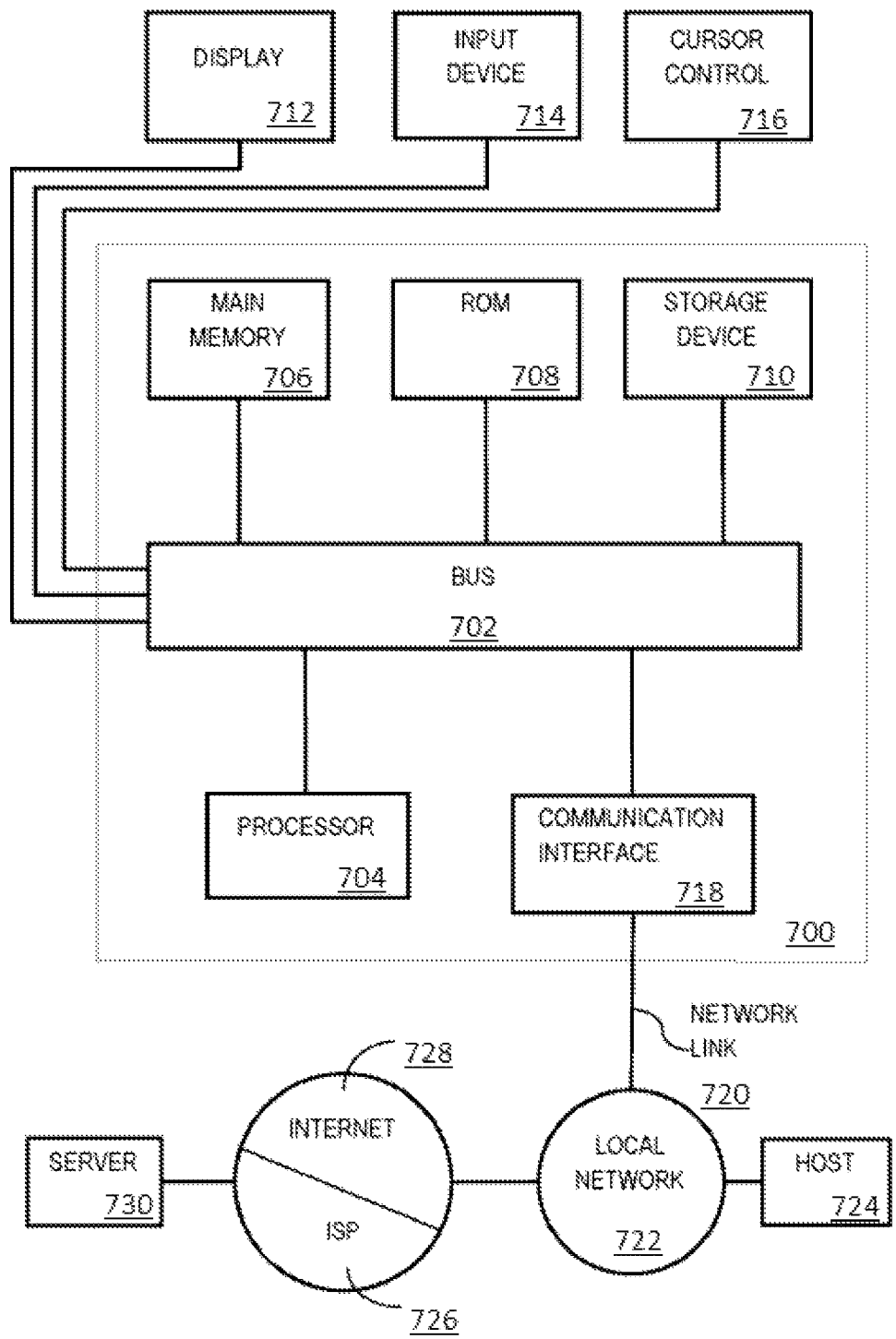
FIG. 7 illustrates a block diagram of a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 740 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
 receiving, from a device associated with an entity, a first request for a first dataset of a plurality of datasets stored in a particular database instance,
  wherein the first dataset is encrypted by a first Database Encryption Key (DEK) associated with a first tenant,
  wherein a second dataset is encrypted by a second DEK associated with a second tenant;

obtaining, from the particular database instance, an encrypted version of the first dataset;
obtaining an encrypted version of the first DEK;
requesting decryption of the encrypted version of the first DEK;
receiving a decrypted version of the first DEK, wherein the decrypted version of the first DEK is generated by applying a first Master Encryption Key (MEK), of the first tenant, to the encrypted version of the first DEK;
maintaining the decrypted version of the first DEK in Random Access Memory (RAM) for use temporarily during a particular session for decrypting a plurality of datasets;
applying, during the particular session, the decrypted version of the first DEK to the encrypted version of the first dataset to obtain a decrypted version of the first dataset;
transmitting, to the device associated with the entity, the decrypted version of the first dataset;
applying, during the particular session, the decrypted version of the first DEK to an encrypted version of a third dataset, of the plurality of datasets and associated with the first tenant, to obtain a decrypted version of the third dataset;
transmitting, to the device associated with the entity, the decrypted version of the third dataset; and
deleting the decrypted version of the first DEK responsive to termination of the particular session.

2. The medium of claim 1, wherein the operations further comprise:
receiving, from the device associated with the entity, a second request for the second dataset;
obtaining, from the particular database instance, an encrypted version of the second dataset;
obtaining an encrypted version of the second DEK;
requesting decryption of the encrypted version of the second DEK;
receiving a decrypted version of the second DEK, wherein the decrypted version of the second DEK is generated by applying a second MEK, of the second tenant, to the encrypted version of the second DEK;
applying the second DEK to the encrypted version of the second dataset to obtain a decrypted version of the second dataset;
transmitting, to the device associated with the entity, the decrypted version of the second dataset.

3. The medium of claim 1, wherein the requesting of the decryption of the encrypted version of the first DEK comprises:
identifying metadata associated with the first DEK;
identifying, within the metadata, an endpoint for a Key Management Service (KMS) vault that stores the first MEK;
transmitting, to the endpoint for the KMS vault, a request to decrypt the encrypted version of the first DEK.

4. The medium of claim 1, wherein the first dataset comprises a particular data block in a file, and wherein the first DEK is applied to an encrypted version of the particular data block without being applied to encrypted versions of other data blocks in the file.

5. The medium of claim 1, wherein the decrypted version of the first DEK is generated by applying the first MEK, of the first tenant, to the encrypted version of the first DEK based at least in part on authorization by the first tenant to decrypt the encrypted version of the first DEK.

6. The medium of claim 2, wherein the decrypted version of the second DEK is generated by applying the second MEK, of the second tenant, to the encrypted version of the second DEK based at least in part on authorization of the second tenant to decrypt the encrypted version of the second DEK.

7. The medium of claim 1, wherein once the decrypted version of the first DEK is received, repeatedly applying the first DEK during a session to decrypt various datasets.

8. The medium of claim 2, wherein once the decrypted version of the second DEK is received, repeatedly applying the second DEK during a session to decrypt various datasets.

9. The medium of claim 1, wherein the first MEK is controlled by the first tenant, and the tenant-controlled first MEK is used to decrypt the first DEK that is stored in the random access memory (RAM) for the particular session and deleted thereafter.

10. The medium of claim 2, wherein the second MEK is controlled by the second tenant, and the tenant-controlled second MEK is used to decrypt the second DEK that is stored in the random access memory (RAM) for a second particular session and deleted thereafter.

11. The medium of claim 1, wherein the first tenant and the second tenant are associated with the same entity.

12. The medium of claim 1, wherein the first dataset is associated with the first tenant, and the second dataset is associated with the second tenant.

13. A method comprising:
receiving, from a device associated with an entity, a first request for a first dataset of a plurality of datasets stored in a particular database instance,
wherein the first dataset is encrypted by a first Database Encryption Key (DEK) associated with a first tenant,
wherein a second dataset is encrypted by a second DEK associated with a second tenant;
obtaining, from the particular database instance, an encrypted version of the first dataset;
obtaining an encrypted version of the first DEK;
requesting decryption of the encrypted version of the first DEK;
receiving a decrypted version of the first DEK, wherein the decrypted version of the first DEK is generated by applying a first Master Encryption Key (MEK), of the first tenant, to the encrypted version of the first DEK;
maintaining the decrypted version of the first DEK in Random Access Memory (RAM) for use temporarily during a particular session for decrypting a plurality of datasets;
applying, during the particular session, the decrypted version of the first DEK to the encrypted version of the first dataset to obtain a decrypted version of the first dataset;
transmitting, to the device associated with the entity, the decrypted version of the first dataset;
applying, during the particular session, the decrypted version of the first DEK to an encrypted version of a third dataset, of the plurality of datasets and associated with the first tenant, to obtain a decrypted version of the third dataset;
transmitting, to the device associated with the entity, the decrypted version of the third dataset; and
deleting the decrypted version of the first DEK responsive to termination of the particular session.

14. The method of claim 13, wherein the operations further comprise:
receiving, from the device associated with the entity, a second request for the second dataset;
obtaining, from the particular database instance, an encrypted version of the second dataset;

obtaining an encrypted version of the second DEK;

requesting decryption of the encrypted version of the second DEK;

receiving a decrypted version of the second DEK, wherein the decrypted version of the second DEK is generated by applying a second MEK, of the second tenant, to the encrypted version of the second DEK;

applying the second DEK to the encrypted version of the second dataset to obtain a decrypted version of the second dataset;

transmitting, to the device associated with the entity, the decrypted version of the second dataset.

15. The method of claim 13, wherein the requesting of the decryption of the encrypted version of the first DEK comprises:

identifying metadata associated with the first DEK;

identifying, within the metadata, an endpoint for a Key Management Service (KMS) vault that stores the first MEK;

transmitting, to the endpoint for the KMS vault, a request to decrypt the encrypted version of the first DEK.

16. The method of claim 13, wherein the first dataset comprises a particular data block in a file, and wherein the first DEK is applied to an encrypted version of the particular data block without being applied to encrypted versions of other data blocks in the file.

17. The method of claim 13, wherein the decrypted version of the first DEK is generated by applying the first MEK, of the first tenant, to the encrypted version of the first DEK based at least in part on authorization by the first tenant to decrypt the encrypted version of the first DEK.

18. The method of claim 14, wherein the decrypted version of the second DEK is generated by applying the second MEK, of the second tenant, to the encrypted version of the second DEK based at least in part on authorization of the second tenant to decrypt the encrypted version of the second DEK.

19. The method of claim 13, wherein once the decrypted version of the first DEK is received, repeatedly applying the first DEK during a session to decrypt various datasets.

20. The method of claim 14, wherein once the decrypted version of the second DEK is received, repeatedly applying the second DEK during a session to decrypt various datasets.

21. A system comprising:

at least one device including a hardware processor;

the system being configured to perform operations comprising:

receiving, from a device associated with an entity, a first request for a first dataset of a plurality of datasets stored in a particular database instance, wherein the first dataset is encrypted by a first Database Encryption Key (DEK) associated with a first tenant, wherein a second dataset is encrypted by a second DEK associated with a second tenant;

obtaining, from the particular database instance, an encrypted version of the first dataset;

obtaining an encrypted version of the first DEK;

requesting decryption of the encrypted version of the first DEK;

receiving a decrypted version of the first DEK, wherein the decrypted version of the first DEK is generated by applying a first Master Encryption Key (MEK), of the first tenant, to the encrypted version of the first DEK;

maintaining the decrypted version of the first DEK in Random Access Memory (RAM) for use temporarily during a particular session for decrypting a plurality of datasets;

applying, during the particular session, the decrypted version of the first DEK to the encrypted version of the first dataset to obtain a decrypted version of the first dataset;

transmitting, to the device associated with the entity, the decrypted version of the first dataset;

applying, during the particular session, the decrypted version of the first DEK to an encrypted version of a third dataset, of the plurality of datasets and associated with the first tenant, to obtain a decrypted version of the third dataset;

transmitting, to the device associated with the entity, the decrypted version of the third dataset; and deleting the decrypted version of the first DEK responsive to termination of the particular session.

* * * * *